US012252872B2

(12) United States Patent
Sato et al.

(10) Patent No.: US 12,252,872 B2
(45) Date of Patent: Mar. 18, 2025

(54) ABNORMALITY DIAGNOSIS DEVICE FOR PLANETARY GEAR SPEED REDUCER AND CONSTRUCTION MACHINE

(71) Applicant: HITACHI CONSTRUCTION MACHINERY CO., LTD., Tokyo (JP)

(72) Inventors: Motoki Sato, Tokyo (JP); Makoto Henmi, Tokyo (JP); Masahiko Ono, Tokyo (JP); Hayato Masuda, Ibaraki (JP); Shinichi Sekido, Ibaraki (JP); Tomoharu Morita, Ibaraki (JP); Tatsuya Ono, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/689,493

(22) PCT Filed: Nov. 1, 2022

(86) PCT No.: PCT/JP2022/040934
§ 371 (c)(1),
(2) Date: Mar. 6, 2024

(87) PCT Pub. No.: WO2023/080140
PCT Pub. Date: May 11, 2023

(65) Prior Publication Data
US 2025/0034845 A1 Jan. 30, 2025

(30) Foreign Application Priority Data
Nov. 2, 2021 (JP) .................................. 2021-179175

(51) Int. Cl.
*F16H 57/08* (2006.01)
*E02F 9/26* (2006.01)
(Continued)

(52) U.S. Cl.
CPC ............. *E02F 9/267* (2013.01); *F16H 57/08* (2013.01); *G01M 13/021* (2013.01); *G01M 13/028* (2013.01); *B60W 30/20* (2013.01)

(58) Field of Classification Search
CPC ....... F16H 57/08; E02F 9/267; G01M 13/021; G01M 13/028; B60W 30/20
See application file for complete search history.

(56) References Cited

U.S. PATENT DOCUMENTS

2019/0033169 A1    1/2019  Kamiy et al.
2019/0186616 A1*   6/2019  Bassis ................... F16H 57/028

FOREIGN PATENT DOCUMENTS

CN    103983454 A  *  8/2014  ............ G01M 13/02
CN    113033304 A       6/2021
(Continued)

OTHER PUBLICATIONS

International Preliminary Report on Patentability received in corresponding International Application No. PCT/JP2022/040934 dated May 16, 2024.
(Continued)

Primary Examiner — Tinh Dang
(74) Attorney, Agent, or Firm — MATTINGLY & MALUR, PC

(57) ABSTRACT

An abnormality diagnosis device for a planetary gear speed reducer includes a second vibration sensor attached to a housing of a hydraulic motor having an output shaft coupled to the planetary gear speed reducer. A controller computes a peak frequency Fm of the hydraulic motor and a speed of rotation of the hydraulic motor on the basis of second vibration data acquired through the second vibration sensor, compute, on the basis of the computed speed of rotation, the number of a plurality of gears included in the planetary gear speed reducer, and the number of teeth of each of the gears, characteristic frequencies fd of the plurality of gears, and (Continued)

determines presence or absence of abnormality in the plurality of gears on the basis of the peak frequency Fm of the hydraulic motor and amplitudes at the characteristic frequencies fd of first vibration data acquired through a first vibration sensor attached to the planetary gear speed reducer.

5 Claims, 8 Drawing Sheets

(51) Int. Cl.
　　　*G01M 13/021*　　(2019.01)
　　　*G01M 13/028*　　(2019.01)
　　　*B60W 30/20*　　　(2006.01)

(56)　　　　　References Cited

FOREIGN PATENT DOCUMENTS

| | | | | |
|---|---|---|---|---|
| JP | 02-088938 A | | 3/1990 | |
| JP | 08-043257 A | | 2/1996 | |
| JP | 2007162806 A | * | 6/2007 | ............... F16H 1/46 |
| WO | 2017170270 A1 | | 10/2017 | |

OTHER PUBLICATIONS

International Search Report of PCT/JP2022/040934 dated Jan. 24, 2023.

* cited by examiner

SPECTRUM WAVEFORM OF
VIBRATION OF HYDRAULIC MOTOR

SPECTRUM WAVEFORM OF
VIBRATION OF SPEED REDUCER
(IN ABNORMAL STATE)

ABNORMALITY DIAGNOSIS DEVICE FOR PLANETARY GEAR SPEED REDUCER AND CONSTRUCTION MACHINE

TECHNICAL FIELD

The present invention relates to an abnormality diagnosis device for a planetary gear speed reducer for a construction machine such as, for example, a hydraulic excavator, and to a construction machine including the speed reducer.

BACKGROUND ART

A planetary gear speed reducer is a device in which a planetary gear mechanism configured from a plurality of gears reduces the speed of rotation inputted to an input shaft to amplify the torque of the rotation and outputs the amplified torque from an output shaft. For abnormality diagnosis for a planetary gear speed reducer, there is known a method in which vibration generated in the proximity of a planetary gear mechanism is sensed and a type, a location and a degree of damage are determined from a frequency of the vibration (for example, Patent Document 1).

In this abnormality diagnosis method, vibration data in the proximity of the planetary gear mechanism obtained by vibration sensing means is first subjected to a frequency analysis process to convert the vibration data into a spectrum waveform. It is known that, in a case where some of teeth of a certain gear of a planetary gear mechanism are damaged, cyclical vibration arising from the damage is generated, and the frequency of the cyclical vibration is determined from specifications of the gears and a speed of rotation. This frequency is referred to as the characteristic frequency. An amplitude at the characteristic frequency is extracted from the spectrum waveform, and, when the extracted value is higher than a threshold value, it is determined that the gear linked to the characteristic frequency is damaged.

PRIOR ART DOCUMENT

Patent Document

Patent Document 1: JP-H8-043257-A

SUMMARY OF THE INVENTION

Problem to be Solved by the Invention

In Patent Document 1, a machine for inputting a fixed speed of rotation to a speed reducer is targeted, and a known value of the speed of rotation can be inputted as installation specifications, and in abnormality diagnosis, it is not necessary to measure an actual speed of rotation by using a sensor or the like. However, in a planetary gear speed reducer coupled to a hydraulic motor of a construction machine, the speed of rotation inputted from the hydraulic motor is variable, and therefore, it is essentially required to perform measurement of an actual speed of rotation (acquisition of actual speed-of-rotation data) in order to achieve correct diagnosis. However, since a planetary gear speed reducer for a construction machine is driven by a hydraulic motor, speed-of-rotation data cannot be obtained from an inverter in many cases, unlike a planetary gear speed reducer that uses an electric motor. Moreover, it is often difficult to measure an actual speed of rotation because, for example, a rotation portion of the hydraulic motor is exposed little in order to prevent invasion of earth and sand or the like and installation of a speed-of-rotation sensor is thus not easy.

The present invention has been made in view of such circumstances as described above, and an object of the present invention resides in provision of an abnormality diagnosis device for a planetary gear speed reducer for a construction machine and a construction machine that can easily perform abnormality diagnosis of the planetary gear speed reducer coupled to a hydraulic motor of a construction machine from which direct acquisition of speed-of-rotation data is difficult.

Means for Solving the Problem

The present application includes a plurality of means for solving the problem described above. As an example of the means, there is provided an abnormality diagnosis device for a planetary gear speed reducer in a construction machine that is driven by a hydraulic motor and the planetary gear speed reducer coupled to an output shaft of the hydraulic motor. The abnormality diagnosis device includes a first vibration sensor attached to a speed reducer housing that is a housing of the planetary gear speed reducer and configured to sense vibration of the speed reducer housing, a second vibration sensor attached to a motor housing that is a housing of the hydraulic motor and configured to sense vibration of the motor housing, and a processor configured to determine presence or absence of abnormality in a plurality of gears included in the planetary gear speed reducer on the basis of sensing results acquired by the first vibration sensor and the second vibration sensor.

The processor is configured to compute a peak frequency corresponding to a peak period of vibration of the hydraulic motor and a speed of rotation of the hydraulic motor from second vibration data acquired by the second vibration sensor, compute characteristic frequencies corresponding to respective rotation periods of the plurality of gears on the basis of the speed of rotation of the hydraulic motor, the number of the plurality of gears, and the number of teeth of each of the plurality of gears, and determine presence or absence of abnormality in the plurality of gears on the basis of the peak frequency of the hydraulic motor and amplitudes at the characteristic frequencies of first vibration data acquired by the first vibration sensor.

Advantages of the Invention

According to the present invention, abnormality diagnosis of a planetary gear speed reducer coupled to a hydraulic motor of a construction machine from which direct acquisition of speed-of-rotation data is difficult can be performed easily.

MODE FOR CARRYING OUT THE INVENTION

In the following, an embodiment of the present invention is described with reference to the drawings.

Figure 1:
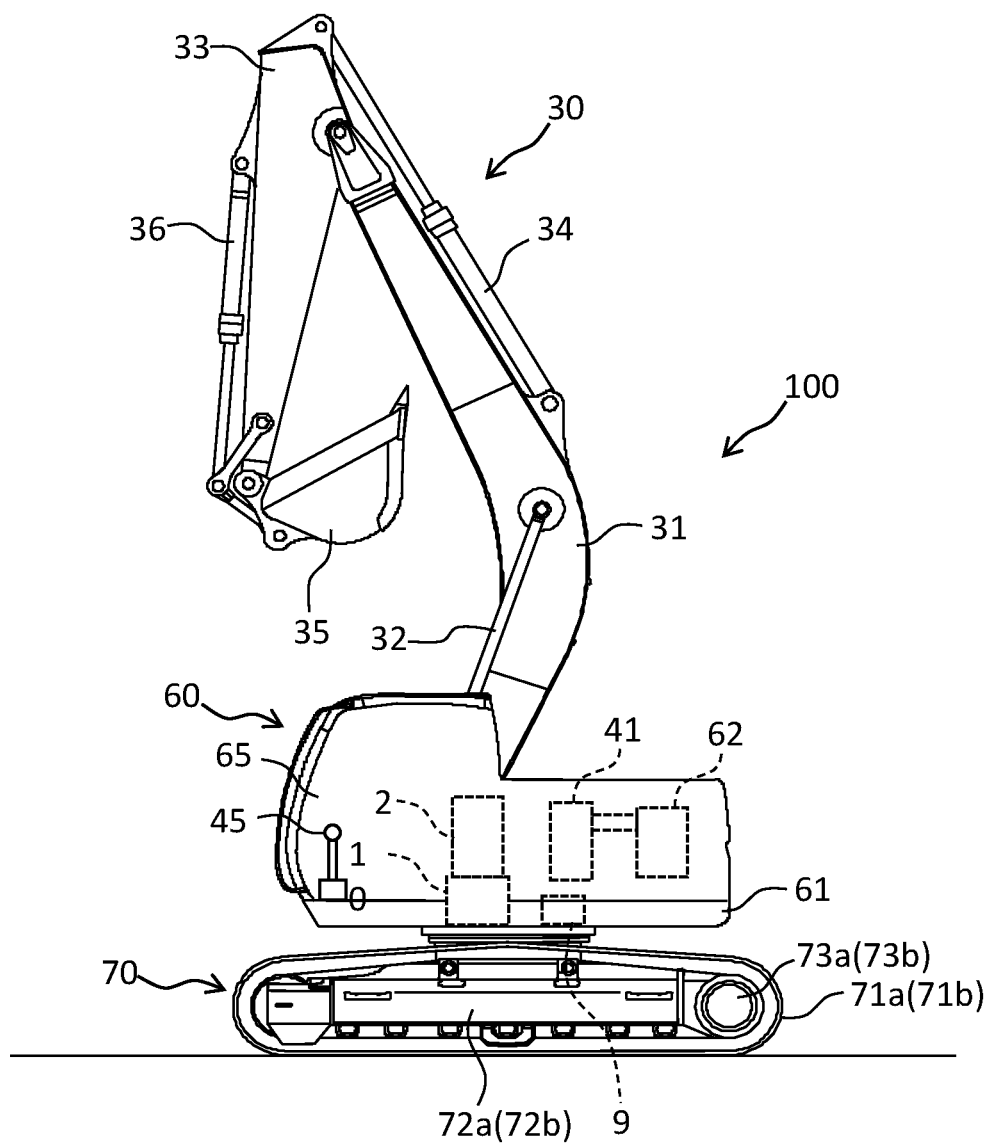
FIG. 1 is a view schematically depicting a side elevation of a hydraulic excavator according to an embodiment of the present invention.

FIG. 1 is a side elevational view schematically depicting an appearance of a hydraulic excavator that is an example of a construction machine according to the present embodiment. It is to be noted that, although the following description is given of a hydraulic excavator that includes a bucket as an attachment positioned at a distal end of a front work device, the attachment is replaceable with various attachments such as a grapple, a breaker, and a lifting magnet other than the bucket.

The hydraulic excavator 100 of FIG. 1 includes a front work device (work device) 30 of an articulated type including a plurality of front members (a boom 31, an arm 33, and a bucket 35) individually pivotally movable in a vertical direction and coupled in series to each other, and an upper swing structure 60 and a lower track structure 70 that configure a machine body. The upper swing structure 60 is provided swingably with respect to the lower track structure 70. The upper swing structure 60 is configured from various members arranged on a swing frame 61, and the swing frame 61 that configures the upper swing structure 60 is swingable with respect to the lower track structure 70. Further, a proximal end of the boom 31 that is a proximal end portion of the front work device 30 is attached pivotally to a front portion of the upper swing structure 60 that configures the machine body, a proximal end of the arm 33 is supported pivotally at a distal end of the boom 31, and the bucket 35 is supported pivotally at a distal end of the arm 33.

The lower track structure 70 includes paired crawlers 71a (71b) respectively extending between and around left-right paired crawler frames 72a (72b), and travel hydraulic motors 73a (73b) that drive the respective crawlers 71a (71b). It is to be noted that, as for the components of the lower track structure 70, only one of the left and right components in each pair is depicted and denoted by a reference character while the other one of the components is denoted only by a reference character in parentheses in the drawings and is not depicted in the drawings.

The boom 31, the arm 33, the bucket 35, and the lower track structure 70 are driven by a boom cylinder 32, an arm cylinder 34, a bucket cylinder 36, and the left and right travel hydraulic motors 73a (73b), respectively, all of which are hydraulic actuators.

The upper swing structure 60 is driven by a swing hydraulic motor 2 through a planetary gear speed reducer 10 and performs rotational movement (swing action) with respect to the lower track structure 70. The planetary gear speed reducer 10 slows down rotation inputted from an output shaft 16 (refer to FIG. 2) of the swing hydraulic motor 2 to amplify the torque of the rotation and outputs the amplified torque from an output shaft 4 (refer to FIG. 2).

On the swing frame 61 configuring the upper swing structure 60, a cab (operation room) 65 in which an operation device 45 for operating the front work device 30 (the plurality of front members 31, 33, and 35), the upper swing structure 60, and the lower track structure 70 is installed, a controller 9 capable of performing abnormality diagnosis of the planetary gear speed reducer 10, and so forth are arranged. In addition, on the swing frame 61, a hydraulic circuit system 41 including a hydraulic pump for supplying hydraulic working fluid to the plurality of hydraulic actuators such as the boom cylinder 32, the arm cylinder 34, the bucket cylinder 36, the swing hydraulic motor 2, and the left and right travel hydraulic motors 73a (73b) is mounted together with an engine 62 that is a prime mover.

Figure 2:
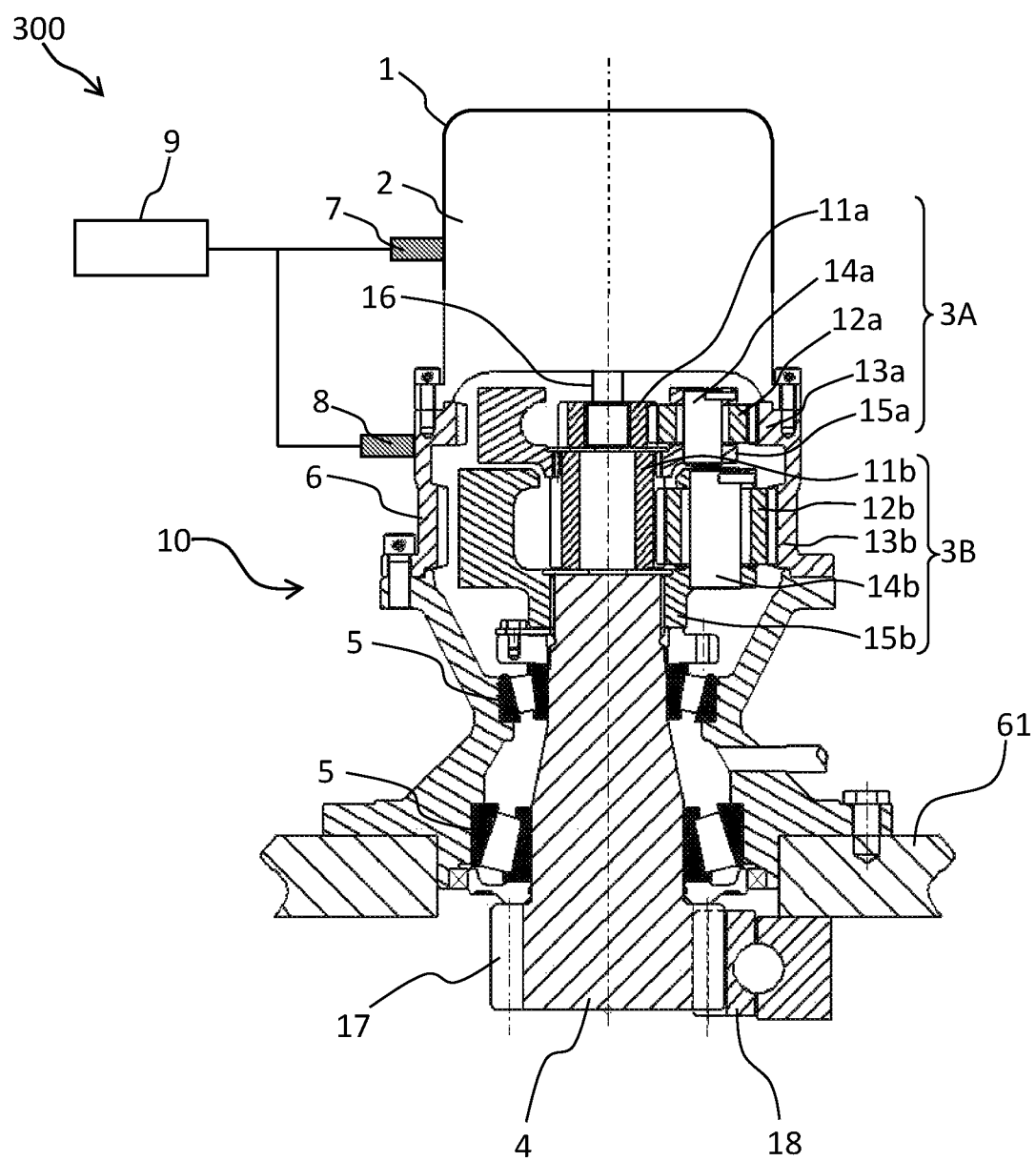
FIG. 2 is a view schematically depicting an axial section of a hydraulic motor 2 and a planetary gear speed reducer 10 incorporated in the hydraulic excavator of FIG. 1.

FIG. 2 is a schematic axial sectional view of an abnormality diagnosis device 300 according to the present embodiment, the hydraulic motor (swing hydraulic motor) 2, and the planetary gear speed reducer 10. The planetary gear speed reducer 10 depicted is configured from two planetary gear mechanisms (a first planetary gear mechanism 3A and a second planetary gear mechanism 3B) coupled to each other in an axial direction, and the output shaft (rotary shaft) 16 of the hydraulic motor 2 is mechanically coupled to the planetary gear speed reducer 10 (specifically, to a sun gear 11a of the first planetary gear mechanism 3A).

Figure 3:
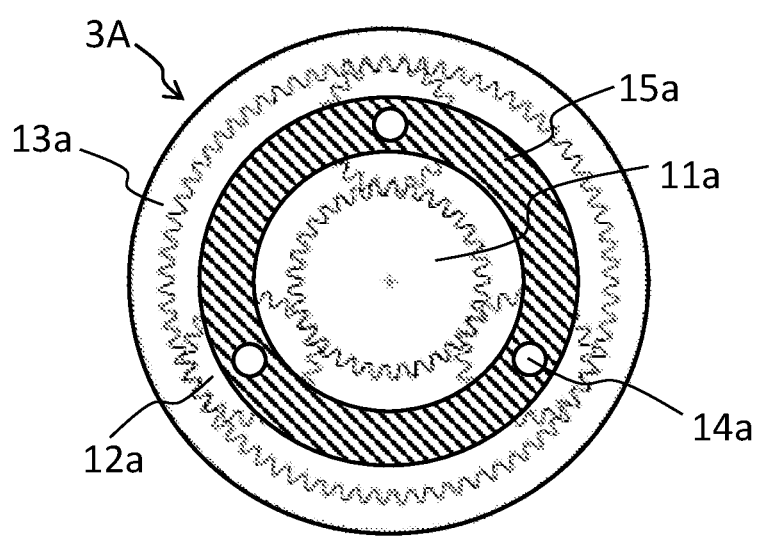
FIG. 3 is a view schematically depicting a transverse section of the planetary gear speed reducer 10 of FIG. 2.

FIG. 3 is a transverse sectional view of the planetary gear speed reducer 10 in a region in which the first planetary gear mechanism 3A is positioned. The first planetary gear mechanism 3A includes a first sun gear 11a fixed to the output shaft (rotary shaft) 16 of the hydraulic motor 2, a plurality of first planetary gears 12a (in the example depicted, three planetary gears 12a) held in meshing engagement with the first sun gear 11a such that they are rotatable while revolving around the first sun gear 11a, a first internal gear 13a fixed to a housing (speed reducer housing) 6 of the planetary gear speed reducer 10 and held in meshing engagement with the plurality of first planetary gears 12a, a plurality of first planetary gear pins 14a inserted in rotation central portions of the respective first planetary gears 12a, and a first carrier 15a fixed to the plurality of first planetary gear pins 14a and rotatable at a revolution speed of the first planetary gears 12a.

The second planetary gear mechanism 3B includes a second sun gear 11b fixed to the first carrier 15a, a plurality of second planetary gears 12b held in meshing engagement with the second sun gear 11b such that they are rotatable while revolving around the second sun gear 11b, a second internal gear 13b fixed to the housing 6 and held in meshing engagement with the plurality of second planetary gears 12b, a plurality of second planetary gear pins 14b inserted in rotation central portions of the respective second planetary gears 12b, and a second carrier 15b fixed to the plurality of second planetary gear pins 14b and rotatable at a revolution speed of the second planetary gears 12b.

The second carrier 15b is coupled to the output shaft 4 of the planetary gear speed reducer 10. A plurality of bearings 5 are provided around the output shaft 4 and support rotation of the output shaft 4. A pinion 17 is provided at a lower end of the output shaft 4 and is held in meshing engagement with swing bearing internal teeth 18 provided on the lower track structure 70. The pinion 17 is rotated by driving force of the hydraulic motor 2, so that the upper swing structure 60 swings (rotates).

In the present embodiment, the housing 6 is a tubular part that covers the plurality of planetary gear mechanisms 3A and 3B and the output shaft 4, and the plurality of bearings 5 are fixed between the housing 6 and the output shaft 4.

To an upper portion of the housing 6, a housing (motor housing) 1 of the hydraulic motor 2 is fixed. As the hydraulic motor 2, for example, a piston motor of the radial type or the axial type can be used. In the present embodiment, the housing 1 is a tubular part that covers a piston, a cylinder block, and so forth that are component parts of the piston motor.

A first vibration sensor 8 is attached to the housing 6 of the planetary gear speed reducer 10 in the proximity of the first planetary gear mechanism 3A (for example, at a position on an outer circumference side of the first internal gear 13a). The first vibration sensor 8 is a sensor that senses vibration generated on the housing 6 of the planetary gear speed reducer 10, and, for example, an acceleration sensor, a velocity sensor, and a contact type displacement sensor can be used as the first vibration sensor 8. In the present embodiment, the first vibration sensor 8 is provided in contact with an outer wall of the housing 6, more particularly, with a side face of the housing 6 (on an outer side of a side wall). For example, the housing 6 is a molded part, and the first vibration sensor 8 includes a magnet (not depicted) by which the first vibration sensor 8 can be fixed to the housing 6.

The attachment position of the first vibration sensor 8 is determined preferably within a range within which the gears are positioned inside the planetary gear speed reducer 10 in the axial direction thereof, and more preferably, at a position as close as possible to the planetary gear mechanism of a diagnosis target. In the example of FIG. 2, the first vibration sensor 8 is attached in the proximity of the first planetary gear mechanism 3A.

A second vibration sensor 7 is attached to the housing 1 of the hydraulic motor 2. The second vibration sensor 7 is a sensor that senses vibration generated on the housing 1 of the hydraulic motor 2, and, for example, an acceleration sensor, a velocity sensor, and a contact type displacement sensor can be used as the second vibration sensor 7. In the present embodiment, the second vibration sensor 7 is provided in contact with an outer wall of the housing 1, more particularly, with a side face of the housing 1 (on an outer side of a side wall). For example, the housing 1 is a molded part, and the second vibration sensor 7 includes a magnet (not depicted) by which the second vibration sensor 7 can be fixed to the housing 1.

The attachment position of the second vibration sensor 7 is preferably set to a position on the surface of the housing 1 spaced as far as possible from the first vibration sensor 8 such that the second vibration sensor 7 can avoid being influenced by the vibration generated on the planetary gear speed reducer 10 as much as possible. The second vibration sensor 7 may otherwise be attached to an upper face (top face) of the housing 1.

It is to be noted that the attachment positions and attachment modes of the first vibration sensor 8 and the second vibration sensor 7 described above are merely illustrative. For example, it is also possible to fasten the first vibration sensor 8 or the second vibration sensor 7 to the housing 6 or 1 by using a screw or to paste the first vibration sensor 8 or the second vibration sensor 7 to the housing 6 or 1 by using a bonding agent or the like. For example, it is only necessary for the first vibration sensor 8 to be attached to the housing 6, and it is only necessary for the second vibration sensor 7 to be attached to the housing 1.

The first vibration sensor 8 and the second vibration sensor 7 are each connected in a manner allowing communication to the controller 9 that includes a processor (for example, a CPU) and a storage device (for example, a ROM or a RAM). The controller 9 performs a process for deciding presence or absence of abnormality in a plurality of gears included in the planetary gear speed reducer 10 on the basis of vibration data acquired through the first vibration sensor 8 and the second vibration sensor 7. In the present embodiment, the first vibration sensor 8, the second vibration sensor 7, and the controller 9 configure the abnormality diagnosis device 300 that determines presence or absence of abnormality in the planetary gear speed reducer 10.

It is to be noted that the connection between each of the first vibration sensor 8 and the second vibration sensor 7 and the controller 9 may be wired connection using a communication cable or the like or may be wireless connection. The controller 9 may be configured from a computer or a microcomputer, and a monitor for displaying a waveform of vibration data or a diagnosis result may be connected to the controller 9. In a case where input signals from the first vibration sensor 8 and the second vibration sensor 7 are analog signals, an AD converter for converting an analog signal into a digital signal may be incorporated in the controller 9. That is, the abnormality diagnosis device 300 may have, for example, a monitor that displays a diagnosis result or diagnosis contents.

Vibration data that is used for abnormality diagnosis by the controller 9 is data measured simultaneously by the first vibration sensor 8 and the second vibration sensor 7. In other words, measurement start timings and measurement end timings of the vibration data of the sensors 8 and 7 used for abnormality diagnosis coincide with each other. For example, the vibration data is data obtained by sampling for several seconds to several tens of seconds at several kHz to tens of kHz.

Figure 4:
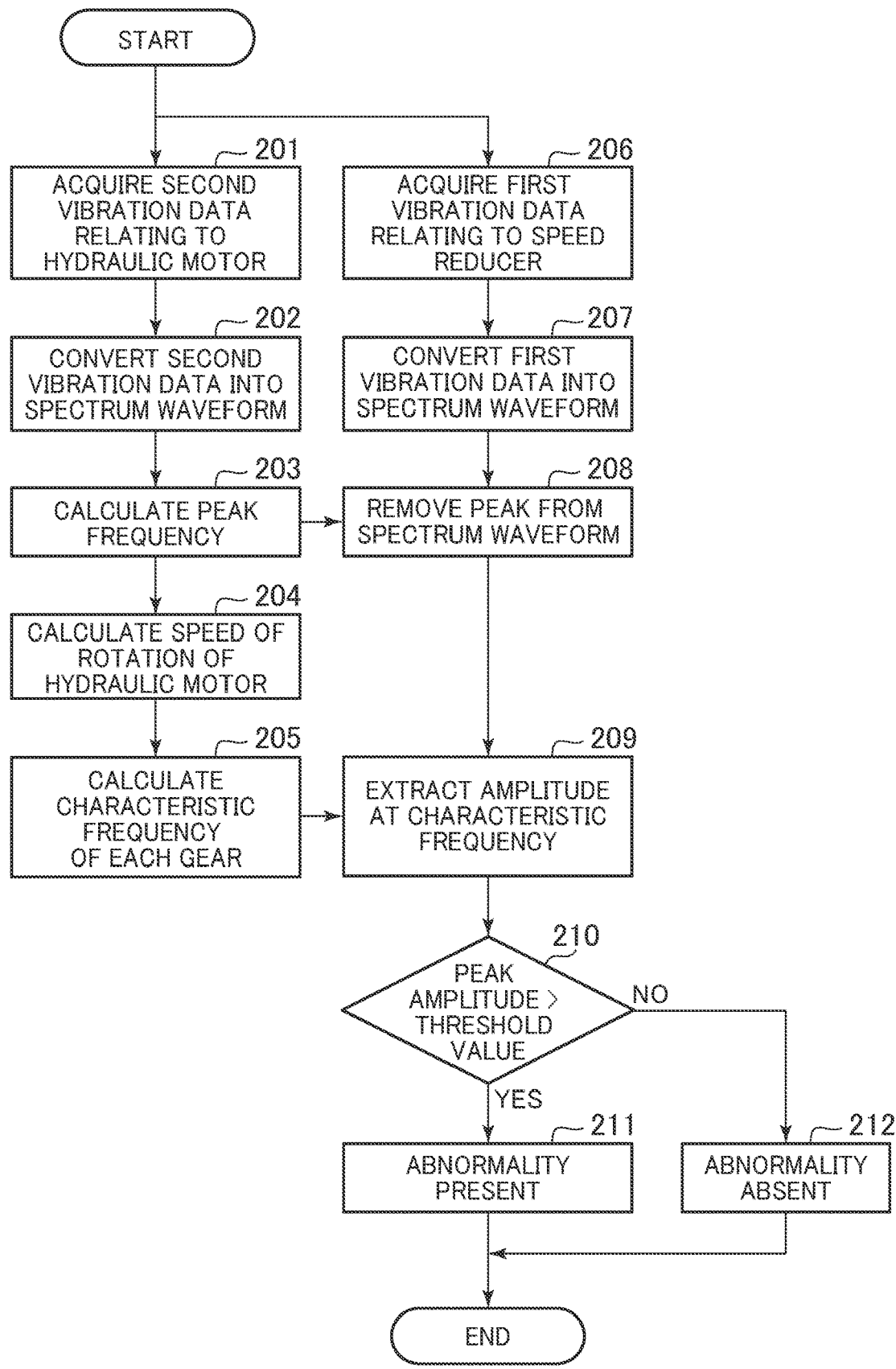
FIG. 4 is a view depicting an example of a flow chart of an abnormality diagnosis process performed by a controller 9.

FIG. 4 is a view depicting an example of a flow chart of the abnormality diagnosis process executed by the controller 9. The controller 9 executes the process depicted in FIG. 4 on the basis of a program stored in the storage device and vibration data acquired through the first vibration sensor 8 and the second vibration sensor 7.

Figure 5:
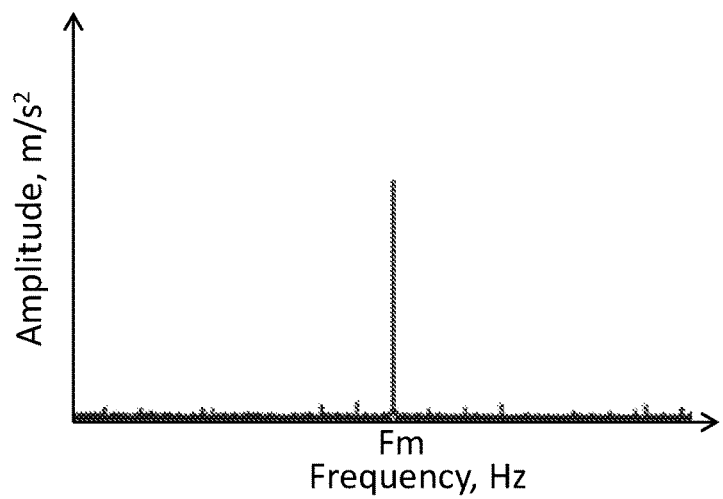
FIG. 5 is a view depicting an example of a spectrum waveform of vibration sensed by a vibration sensor attached to the hydraulic motor 1.

The controller 9 acquires, in step S201, second vibration data relating to the hydraulic motor 2 acquired through the second vibration sensor 7 and converts, in step 202, the second vibration data into a spectrum waveform by fast Fourier transform (FFT). FIG. 5 depicts an example of the spectrum waveform obtained from the second vibration data relating to the hydraulic motor 2. As depicted in FIG. 5, the spectrum waveform is represented by a frequency and an amplitude. It is to be noted that, as a process prior to the fast Fourier transformation of the second vibration data in step 202, a filter process for removing a certain frequency region in the second vibration data, an envelope process for converting the second vibration data into an envelope waveform, and so forth may be performed.

In step 203, the controller 9 calculates a peak frequency Fm corresponding to a peak period of vibration of the hydraulic motor 2 on the basis of the spectrum waveform acquired in step 202. As the calculation method of the peak frequency Fm of the hydraulic motor 2, there is a method of specifying a frequency relating to a peak having a maximum amplitude in the spectrum waveform acquired in step 202 as the peak frequency Fm. When the hydraulic motor 2 rotates, a peak can be confirmed at a certain frequency Fm as depicted in FIG. 5, and this can be calculated as a peak frequency of the hydraulic motor 2. The calculated peak frequency Fm is stored into the storage device in the controller 9.

In step 204, the controller 9 calculates a speed of rotation of the hydraulic motor 2 on the basis of the peak frequency of the hydraulic motor 2 calculated in step 203. The speed of rotation of the hydraulic motor 2 can be calculated as a value obtained by dividing the peak frequency Fm by the number of pistons of the hydraulic motor 2.

In step 205, the controller 9 calculates, on the basis of the speed of rotation of the hydraulic motor 2 calculated in step 204 as well as the number n of the plurality of gears configuring the planetary gear mechanism 3 positioned in the proximity of the first vibration sensor 8 and the number T of teeth of each gear, characteristic frequencies fd of the plurality of gears, namely, individual rotation periods of the plurality of gears. Here, since it is the first planetary gear mechanism 3A that is positioned in the proximity of the first vibration sensor 8, the controller 9 calculates characteristic frequencies fds, fdp, and fdr of the first sun gear 11a, the first planetary gears 12a, and the first internal gear 13a.

If some of the teeth of a certain gear are damaged, then vibration is generated at a certain frequency (characteristic frequency fd). Since the characteristic frequency fd relies upon the speed of rotation, the controller 9 calculates a characteristic frequency of each gear from the speed of rotation of the hydraulic motor 2 calculated in step 204. The characteristic frequencies fds, fdp, and fdr of the gears 11a, 12a, and 13a can be computed by expressions (1) to (3) given below, respectively. Here, f is a rotation frequency, T is the number of teeth of each gear, n is the number of planetary gears, and the suffixes s, p, and r signify the sun gear, a planetary gear, and the internal gear, respectively. The rotation frequency fs of the first sun gear 11a can be computed from the speed of rotation of the hydraulic motor 2 calculated in step 204.

[Math. 1]
$$f_{ds} = \frac{T_r}{T_s + T_r} f_s \times n \qquad \text{Expression (1)}$$

[Math. 2]
$$f_{dp} = \frac{T_s \cdot T_r}{T_p(T_s + T_r)} f_s \qquad \text{Expression (2)}$$

[Math. 3]
$$f_{dr} = \frac{T_s}{T_s + T_r} f_s \times n \qquad \text{Expression (3)}$$

It is to be noted that a meshing frequency fz may be calculated in place of the characteristic frequency fd. The meshing frequency fz indicates the number of times by which teeth of a gear mesh per second, and, in the case of the planetary gear speed reducer 10, can be computed by an expression (4) given below.

[Math. 4]
$$f_z = \frac{T_s \cdot T_r}{T_s + T_r} f_s \qquad \text{Expression (4)}$$

Figure 6:
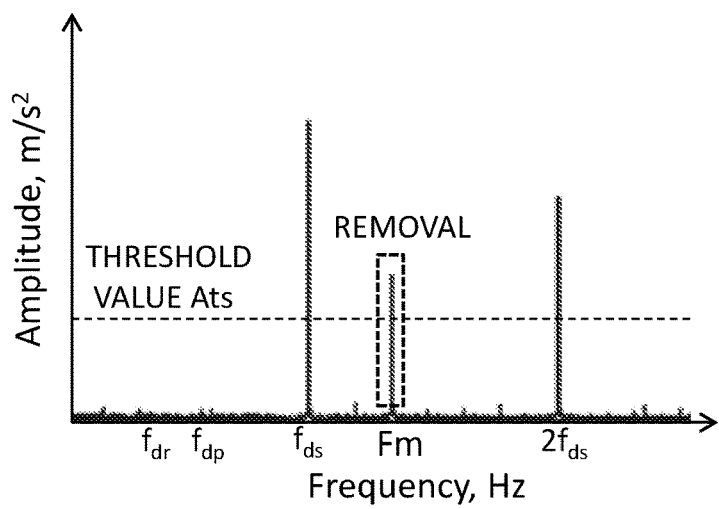
FIG. 6 is a view depicting an example of a spectrum waveform of vibration (in an abnormal state) sensed by a vibration sensor attached to the planetary gear speed reducer 10.

Further, the controller 9 acquires, in step 206, first vibration data relating to the planetary gear speed reducer 10 that is acquired through the first vibration sensor 8, and converts, in step 207, the first vibration data into a spectrum waveform by fast Fourier transform (FFT). FIG. 6 depicts an example of the spectrum waveform obtained from the first vibration data relating to the planetary gear speed reducer 10. It is to be noted that, as a process prior to the fast Fourier transformation of the first vibration data in step 207, a filter process for removing a certain frequency region in the first vibration data, an envelope process for converting the first vibration data into an envelope waveform, and so forth may be performed.

The spectrum waveform of FIG. 6 indicates an example of a case where the first sun gear 11a is damaged, and a peak at the peak frequency Fm of the hydraulic motor 2 calculated in step 203 and two peaks appearing at the characteristic frequency fds and a frequency 2fds of its integer multiple generated due to the damage to the first sun gear 11a can be confirmed. It is to be noted that, in a case where no gear is damaged (in other words, in a normal state), no peak is observed at the characteristic frequency fd and a frequency nfd of its integer multiple. Further, in a case where a gear is damaged severely and great vibration is generated, even in a spectrum waveform of the hydraulic motor 2, a peak is sometimes observed at the characteristic frequency. In this regard, since vibration due to the damage to the first sun gear 11a in the present embodiment is very small, almost no peak is observed at the characteristic frequency fds in the spectrum waveform of the hydraulic motor 2 of FIG. 5.

Figure 7:
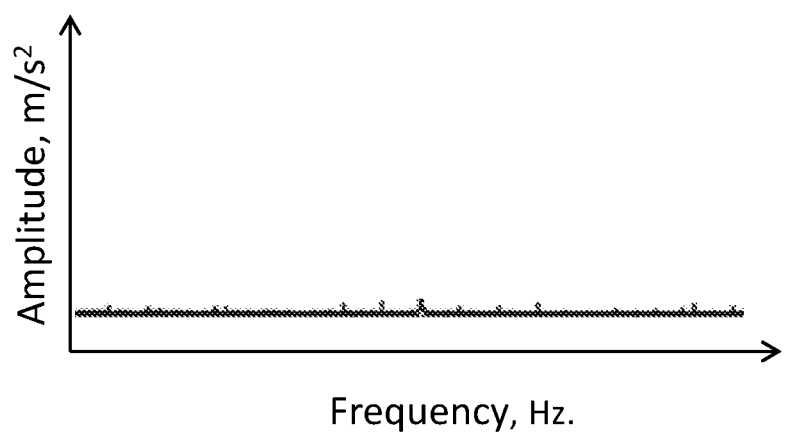
FIG. 7 is a view depicting an example of a spectrum waveform of vibration (in a normal state) sensed by the vibration sensor attached to the planetary gear speed reducer 10.

In step 208, the controller 9 searches the spectrum waveform obtained by the conversion of the first vibration data in step 207 for a peak at the peak frequency Fm of the hydraulic motor 2 computed in step 203 and, if a peak is found, removes the peak. That is, in the example of FIG. 6, the controller 9 sets the amplitude at the frequency Fm surrounded by a broken line to zero to remove the peak. In a case where the characteristic frequency fd and the peak frequency Fm of the hydraulic motor 2 are close to each other, there is the possibility that the amplitude at the peak frequency Fm may be included in a characteristic frequency amplitude to be calculated (extracted) in subsequent step 209, resulting in making of a wrong diagnosis. However, if a peak at the peak frequency Fm is removed as in the present embodiment, then presence or absence of appearance of a peak at the characteristic frequency fd of each gear in the remaining spectrum waveform can be distinguished readily, and therefore, the influence of noise caused by rotation of the hydraulic motor 2 can be reduced, and, as a result, the accuracy of abnormality diagnosis is improved. It is to be noted that, as the frequency at which a peak is to be removed, not only the peak frequency Fm but also a frequency within a predetermined range around the peak frequency Fm may be targeted. Further, an example of a spectrum waveform of vibration of the planetary gear speed reducer 10 in a normal state in which the gears are free from damage (note that the peak frequency Fm of the hydraulic motor 2 has been removed) is depicted in FIG. 7.

In step 209, the controller 9 extracts an amplitude at the characteristic frequencies fds, fdp, and fdr calculated in step 205, from the spectrum waveform from which a peak has been removed in step 208. At this time, an amplitude at frequencies of integer multiples of the characteristic frequencies fds, fdp, and fdr may further be extracted. At the time of extraction of an amplitude, a maximum peak may be searched for from within a range of the frequency of the extraction target±several Hz taking an error of the calculated speed of rotation of the hydraulic motor 2 into consideration, and the amplitude of the maximum peak may be determined as an amplitude at the frequency of the extraction target.

In step 210, the controller 9 compares the amplitudes at the characteristic frequencies fds, fdp, and fdr extracted in step 209 with threshold values Ats, Atp, and Atr linked to the characteristic frequencies, respectively. As a result of the comparison, when the amplitudes are equal to or lower than the respective threshold values At, then the controller 9 determines that the gears are not abnormal (step 212), but when an amplitude is higher than a corresponding threshold value At, then the controller 9 determines that the gear linked to the characteristic frequency fd of this amplitude is in a damaged state (is abnormal) (step 211). The threshold values At are values set in advance. As the method for determining each threshold value At, a method of determining the threshold value At by an experiment, a method of setting an amplitude value in a normal state or an integer multiple of the amplitude value as the threshold value At, a method of determining the threshold value At by machine learning, and so forth are available. The threshold value At sometimes differs among different characteristic frequencies.

In the example of the spectrum waveform of the speed reducer 10 of FIG. 6, a peak is found in step 209 in the amplitude at the characteristic frequency fds of the first sun gear 11a and the frequency 2fds which is twice the characteristic frequency fds. Comparison between the amplitudes of the found peaks and the threshold value Ats is performed in step 210, and since the amplitudes of the found peaks are higher than the threshold value Ats, a diagnosis that the first sun gear 11a is in a damaged state is made (step 211).

Advantageous Effect

As described above, in the present embodiment, the abnormality diagnosis device 300 for the planetary gear speed reducer 10 in the hydraulic excavator 100 that is driven by the hydraulic motor 2 and the planetary gear speed reducer 10 coupled to the output shaft 4 of the hydraulic motor 2 includes the first vibration sensor 8 attached to the speed reducer housing 6 that is the housing of the planetary gear speed reducer 10 and configured to sense vibration of the speed reducer housing 6, the second vibration sensor 7 attached to the motor housing 1 that is the housing of the hydraulic motor 2 and configured to sense vibration of the motor housing 1, and the processor (controller 9) that determines presence or absence of abnormality in the plurality of gears 11, 12, and 13 included in the planetary gear speed reducer 3 on the basis of sensing results acquired by the first vibration sensor 8 and the second vibration sensor 7. The processor (controller 9) computes the peak frequency Fm corresponding to the peak period of the vibration of the hydraulic motor 2 and the speed of rotation of the hydraulic motor 2 from the second vibration data acquired by the second vibration sensor 7, computes the characteristic frequencies fd corresponding to the respective rotation periods of the plurality of gears 11, 12, and 13 on the basis of the speed of rotation of the hydraulic motor 2, the number of the plurality of gears 11, 12, and 13, and the number of teeth of each of the plurality of gears 11, 12, and 13, and determines presence or absence of abnormality in the plurality of gears 11, 12, and 13 on the basis of the peak frequency Fm of the hydraulic motor 2 and the amplitudes at the characteristic frequencies of the first vibration data acquired by the first vibration sensor 8.

That is, in the abnormality diagnosis device 300 of the present embodiment and the hydraulic excavator (construction machine) 100 that includes the abnormality diagnosis device 300, the second vibration sensor 7 is attached to the housing 1 of the hydraulic motor 2, and the second vibration data acquired using the second vibration sensor 7 is used to implement the computation of the peak frequency Fm of the hydraulic motor 2 and the computation of the speed of rotation of the hydraulic motor 2 from the computed peak frequency Fm. In other words, the speed of rotation of the hydraulic motor 2 is calculated using the second vibration data without directly acquiring it from a speed-of-rotation sensor or the like. Then, the characteristic frequency fd of each gear is computed using the computed speed of rotation of the hydraulic motor 2, and the amplitude at a peak frequency of the hydraulic motor 2 in a spectrum waveform acquired using the first vibration sensor 8 is removed to implement the abnormality diagnosis of the gears based on the characteristic frequency fd of the planetary gear speed reducer 10 coupled to the hydraulic motor 2. Accordingly, in the planetary gear speed reducer coupled to the hydraulic motor of a construction machine from which direct acquisition of speed-of-rotation data is difficult, the abnormality diagnosis device of the present embodiment can compute the speed of rotation of the hydraulic motor 2 by using the second vibration sensor 7, and therefore, abnormality diagnosis of the planetary gear speed reducer for a construction machine can be performed readily.

(Modification 1)

In step 208 of the flow chart of FIG. 4 described above, the process for removing an amplitude (peak) at the peak frequency Fm in a spectrum waveform (for example, FIG. 6) relating to the first vibration data is performed. However, if the peak frequency Fm is calculated already, then the process for removing a peak at the peak frequency Fm is not necessary for abnormality diagnosis. That is, a flow chart of FIG. 8 in which the peak removing process is omitted may be executed by the controller 9 to perform abnormality diagnosis.

In particular, in the present modification, the controller 9 computes, on the basis of the speed of rotation of the hydraulic motor 2 as well as the number of the plurality of gears of the planetary gear speed reducer 10 and the number of teeth of each of the gears, a characteristic frequency fd corresponding to the rotation period of the plurality of gears, and determines presence or absence of abnormality in the plurality of gears on the basis of the peak frequency Fm of the hydraulic motor 2 and the amplitude at the characteristic frequency fd of the first vibration data acquired by the first vibration sensor 8.

Figure 8:
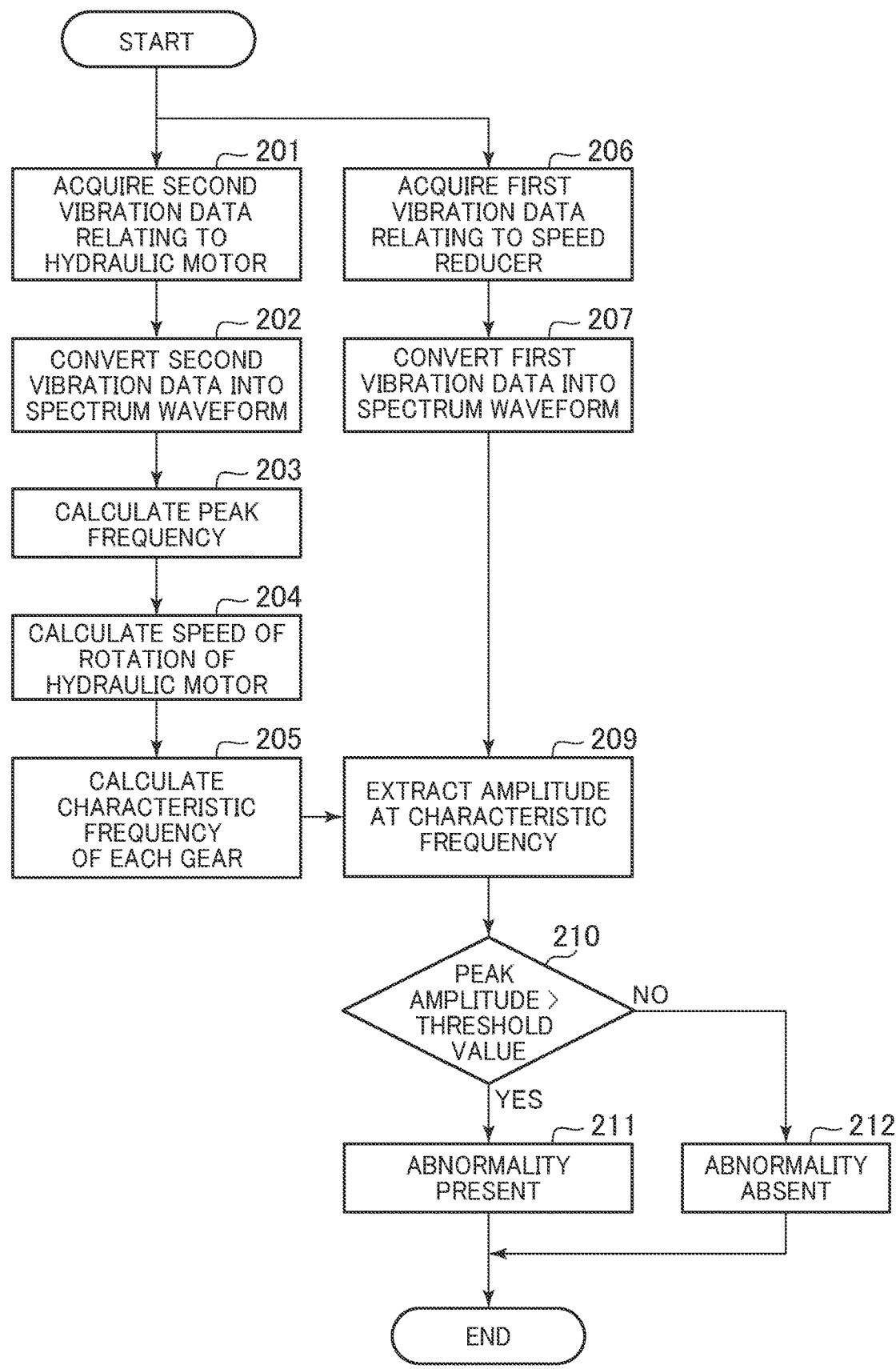
FIG. 8 is a view depicting an example of a flow chart of the abnormality diagnosis process performed by the controller 9.

FIG. 8 is a view depicting one of modifications of the flow chart of the abnormality diagnosis process executed by the controller 9. In the flow chart of FIG. 8, the peak removing process in step 208 has been removed from the flow chart of FIG. 4. Even if such a process as just described is performed, it is possible to easily perform abnormality diagnosis of a planetary gear speed reducer coupled to a hydraulic motor of a construction machine from which direct acquisition of speed-of-rotation data is difficult.

(Modification 2)

In step 210 of the flow charts of FIGS. 4 and 8 described above, the process for extracting amplitudes at the characteristic frequencies fd of the individual gears and comparing them with the respective threshold values At is performed. However, in place of the process in step 210, a process of totaling the amplitude at the characteristic frequency fd and the amplitude at a frequency of an integer multiple of the characteristic frequency fd in regard to each of the gears (that is, totaling the plurality of amplitudes extracted in step 209 for each gear) and comparing the total value with a threshold value may be performed. If the process in step 210 is changed to such a process as just described, then, since the difference between the amplitude obtained when the gear is abnormal and the amplitude obtained when the gear is normal appears more clearly, the accuracy of the abnormality diagnosis of the gears can be improved. It is to be noted that the threshold value in this case may be different from that in step 210.

(Modification 3)

Figure 9:
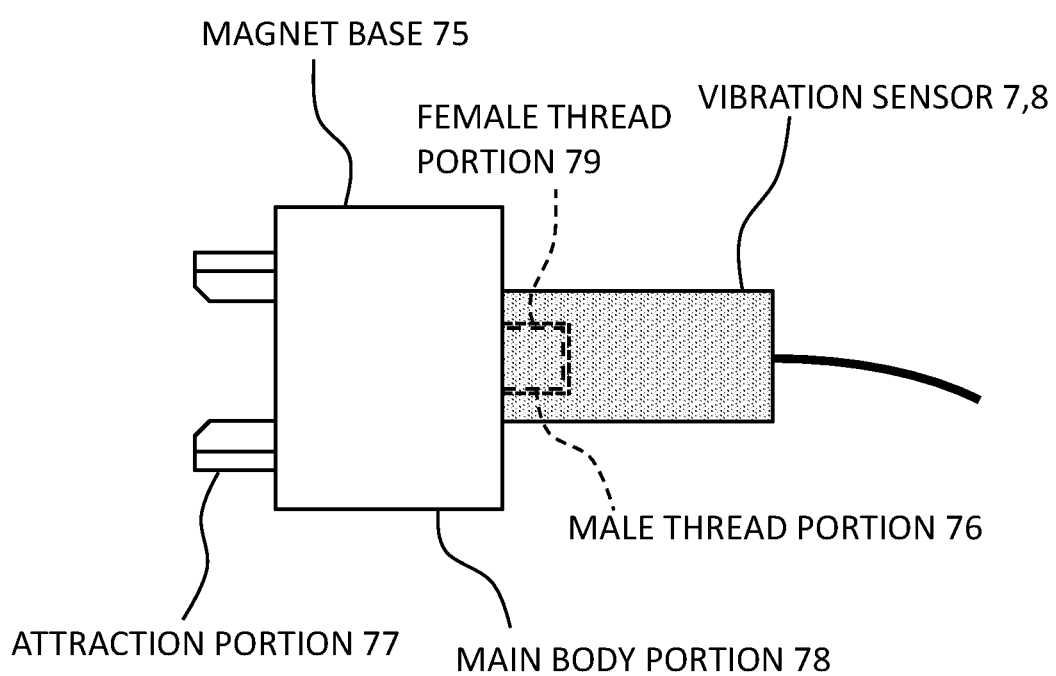
FIG. 9 is a view depicting an example of an attachment jig for a vibration sensor used in the embodiment of the present invention.

A jig that is used when the first vibration sensor 8 and the second vibration sensor 7 are attached to the housings 6 and 1, respectively, is described. FIG. 9 is a schematic configuration view of a magnet base 75 that is an attachment jig for the first vibration sensor 8 and the second vibration sensor 7.

The magnet base 75 has a male thread portion 76 projecting from a main body portion 78 of a substantially rectangular parallelepiped shape and having a thread formed on an outer periphery thereof. When a female thread portion 79 provided on the vibration sensor 7 or 8 is fastened to the male thread portion 76, the second vibration sensor 7 or 8 is fixed to the magnet base 75.

A selector switch (not depicted) such as a lever or a dial for causing two attraction portions 77 projecting from the main body portion 78 to generate magnetic force is provided on the magnet base 75, and when the selector switch is switched from OFF to ON, strong magnetic force is generated at the attraction portions 77.

When the vibration sensor 8 or 7 is fixed to the magnet base 75 through the thread portions 76 and 79 and the selector switch is switched ON in a state in which the attraction portions 77 are in contact at a desired position with the housing 6 or 1 that is made of a ferromagnetic material, the magnet base 75 is attracted and fixed to the surface of the housing 6 or 1 by the magnetic force generated from the attraction portions 77. By using such an attachment jig (magnet base 75) as described above, the vibration sensors 8 and 7 can be fixed readily and firmly to the housings 6 and 1, respectively, and acquisition of vibration data by the vibration sensors 8 and 7 is facilitated.

(Modification 4)

Although, in the embodiment described above, abnormality diagnosis of the speed reducer 10 (gears) is performed by the controller 9 incorporated in the construction machine (hydraulic excavator 100) that includes the hydraulic motor 2 and the speed reducer 10, the abnormality diagnosis may otherwise be performed outside the construction machine. In other words, the abnormality diagnosis device 300 need not entirely be a component of the hydraulic excavator. For example, the abnormality diagnosis device 300 may include, as the controller 9 of the abnormality diagnosis device 300, an information processing device provided outside the hydraulic excavator 100, and the information processing device may be configured such that it can communicate with the first vibration sensor 8 and the second vibration sensor 7.

More particularly, such a configuration may be adopted that, for example, vibration data acquired through the first vibration sensor 8 and the second vibration sensor 7 is transmitted to an external computer (for example, a server connected to the Internet) through communication equipment (for example, a wireless communication device) such that the computer performs abnormality diagnosis. As an alternative, such a configuration may be adopted that, in place of the controller 9, a storage device that stores vibration data acquired through the first vibration sensor 8 and the second vibration sensor 7 is incorporated such that the vibration data stored in the storage device is moved or transmitted to another terminal (computer or the like) and abnormality diagnosis is performed by the other terminal. As another alternative, such a configuration may be adopted that communication equipment (for example, a wireless communication device) is incorporated in addition to the storage device and the vibration data stored in the storage device is transmitted to an external computer (for example, a server connected to the Internet) through the communication equipment such that abnormality diagnosis is performed by the computer.

(Others)

It is to be noted that, although the foregoing description is directed to the case in which the first vibration sensor 8 is attached in the proximity of the first planetary gear mechanism 3A, it is a matter of course that the first vibration sensor 8 may be attached in the proximity of the second planetary gear mechanism 3B to perform abnormality diagnosis of the gears included in the second planetary gear mechanism 3B.

Further, although the characteristic frequency fd of each gear is computed in step 205 in FIG. 4 and so forth, only the characteristic frequency fd of a specific gear may be computed. In this case, in step 209, an amplitude at the characteristic frequency fd of the specific gear and an amplitude at a frequency of an integer multiple of the characteristic frequency fd may be extracted, and in step 210, comparison between the extracted amplitudes and a threshold value may be performed to determine presence or absence of abnormality in the specific gear.

Further, while the foregoing description is given with reference to FIG. 2 in which the two vibration sensors 7 and 8 are attached to the housings 1 and 6 of the hydraulic motor 2 and the planetary gear speed reducer 10, respectively, the two vibration sensors 7 and 8 need not always be kept attached to the housings 1 and 6. In other words, the two vibration sensors 7 and 8 may be attached to the housings 1 and 6, respectively, only when maintenance work is to be performed.

The present invention is not restricted to the embodiment described hereinabove and includes various modifications without departing from the subject matter thereof. For example, the present invention is not restricted to what includes all the components described above in connection with the embodiment, and includes also what does not include some of the components. Further, it is possible to add or replace part of components in one embodiment to or with components of another embodiment.

Further, the components relating to the controller 9 described above and the functions, execution processes, and so forth of the components may be implemented entirely or partly by hardware (for example, by designing logics for executing the functions as an integrated circuit or the like). Further, the configuration relating to the controller 9 may be a program (software) that is read out and executed by a computational processing device (for example, a CPU) to implement the functions relating to the configuration of the controller 9. Information relating to the program can be stored, for example, in a semiconductor memory (flash memory, SSD, or the like), a magnetic storage device (hard disk drive or the like), and a recording medium (magnetic disk, optical disk, or the like).

Further, although, in the foregoing description of the embodiments, only those of controls lines and information lines that are recognized as necessary for description of the embodiments are indicated, all of control lines and information lines necessary for a product are not necessarily indicated. It may be considered that almost all components are connected to one another in practice.

DESCRIPTION OF REFERENCE CHARACTERS

1: Housing (motor housing)
2: Hydraulic motor (swing hydraulic motor)
3: Planetary gear mechanism
4: Output shaft
5: Bearing
6: Housing (speed reducer housing)
7: Second vibration sensor
8: First vibration sensor
9: Controller
10: Planetary gear speed reducer
11a: First sun gear
11b: Second sun gear
12a: First planetary gear
12b: Second planetary gear
13a: First internal gear
13b: Second internal gear
14a: First planetary gear pin
14b: Second planetary gear pin
15a: First carrier
15b: Second carrier
16: Output shaft (rotary shaft)
17: Pinion
18: Swing bearing internal teeth
30: Front work device (work device)
60: Upper swing structure
61: Swing frame
75: Magnet base
76: Male thread portion
77: Attraction portion
78: Main body portion
79: Female thread portion
100: Hydraulic excavator
300: Abnormality diagnosis device

The invention claimed is:

1. An abnormality diagnosis device for a planetary gear speed reducer in a construction machine that is driven by a hydraulic motor and the planetary gear speed reducer coupled to an output shaft of the hydraulic motor, comprising:
a first vibration sensor attached to a speed reducer housing that is a housing of the planetary gear speed reducer and configured to sense vibration of the speed reducer housing;
a second vibration sensor attached to a motor housing that is a housing of the hydraulic motor and configured to sense vibration of the motor housing; and
a processor configured to determine presence or absence of abnormality in a plurality of gears included in the planetary gear speed reducer on a basis of sensing results acquired by the first vibration sensor and the second vibration sensor, wherein
the processor is configured to
compute a peak frequency corresponding to a peak period of vibration of the hydraulic motor and a speed of rotation of the hydraulic motor from second vibration data acquired by the second vibration sensor,
compute characteristic frequencies corresponding to respective rotation periods of the plurality of gears on a basis of the speed of rotation of the hydraulic motor, number of the plurality of gears, and number of teeth of each of the plurality of gears, and
determine presence or absence of abnormality in the plurality of gears on a basis of the peak frequency of the hydraulic motor and amplitudes at the characteristic frequencies of first vibration data acquired by the first vibration sensor.

2. The abnormality diagnosis device for a planetary gear speed reducer according to claim 1, wherein
the processor is configured to convert the second vibration data into a spectrum waveform, compute a peak frequency of the hydraulic motor on a basis of the spectrum waveform, and determine as the speed of rotation of the hydraulic motor a value obtained by dividing the peak frequency of the hydraulic motor by number of pistons of the hydraulic motor.

3. The abnormality diagnosis device for a planetary gear speed reducer according to claim 2, wherein
the processor is configured to convert the second vibration data into a spectrum waveform and compute a frequency relating to a peak having a maximum amplitude in the spectrum waveform as the peak frequency of the hydraulic motor.

4. The abnormality diagnosis device for a planetary gear speed reducer according to claim 1, wherein
the processor is configured to convert the first vibration data into a spectrum waveform, remove a peak at a peak frequency of the hydraulic motor from the spectrum waveform, extract an amplitude at a characteristic frequency of one of the plurality of gears from the spectrum waveform from which the peak at the peak frequency has been removed, and determine, in a case the extracted amplitude at the characteristic frequency of the one gear exceeds a threshold value linked to the characteristic frequency of the one gear, that the one gear is abnormal.

5. A construction machine comprising:
a hydraulic motor that drives a swing structure;
a planetary gear speed reducer coupled to an output shaft of the hydraulic motor;
a first vibration sensor attached to a speed reducer housing that covers the planetary gear speed reducer; and
a controller configured to determine presence or absence of abnormality in a plurality of gears included in the planetary gear speed reducer, wherein
the construction machine further includes a second vibration sensor attached to a motor housing that covers the hydraulic motor, and
the controller is configured to
compute a peak frequency corresponding to a peak period of vibration of the hydraulic motor and a speed of rotation of the hydraulic motor on a basis of second vibration data acquired by the second vibration sensor,
compute characteristic frequencies corresponding to respective rotation periods of the plurality of gears on a basis of the speed of rotation of the hydraulic motor, number of the plurality of gears, and number of teeth of each of the plurality of gears, and
determine presence or absence of abnormality in the plurality of gears on a basis of the peak frequency of the hydraulic motor and amplitudes at the characteristic frequencies of first vibration data acquired by the first vibration sensor.

\* \* \* \* \*